Aug. 16, 1927.

L. C. WEAVER 1,639,545

AUTOMATIC CONTROL FOR WINDMILLS

Filed Nov. 22, 1926     5 Sheets-Sheet 1

Inventor
L. C. Weaver
by Mawhinney & Mawhinney
Attorneys.

Aug. 16, 1927.

L. C. WEAVER 1,639,545

AUTOMATIC CONTROL FOR WINDMILLS

Filed Nov. 22, 1926    5 Sheets-Sheet 2

Inventor
L. C. Weaver
by Mawhinney & Mawhinney
Attorneys.

Aug. 16, 1927.
L. C. WEAVER
AUTOMATIC CONTROL FOR WINDMILLS
Filed Nov. 22, 1926  5 Sheets-Sheet 3
1,639,545
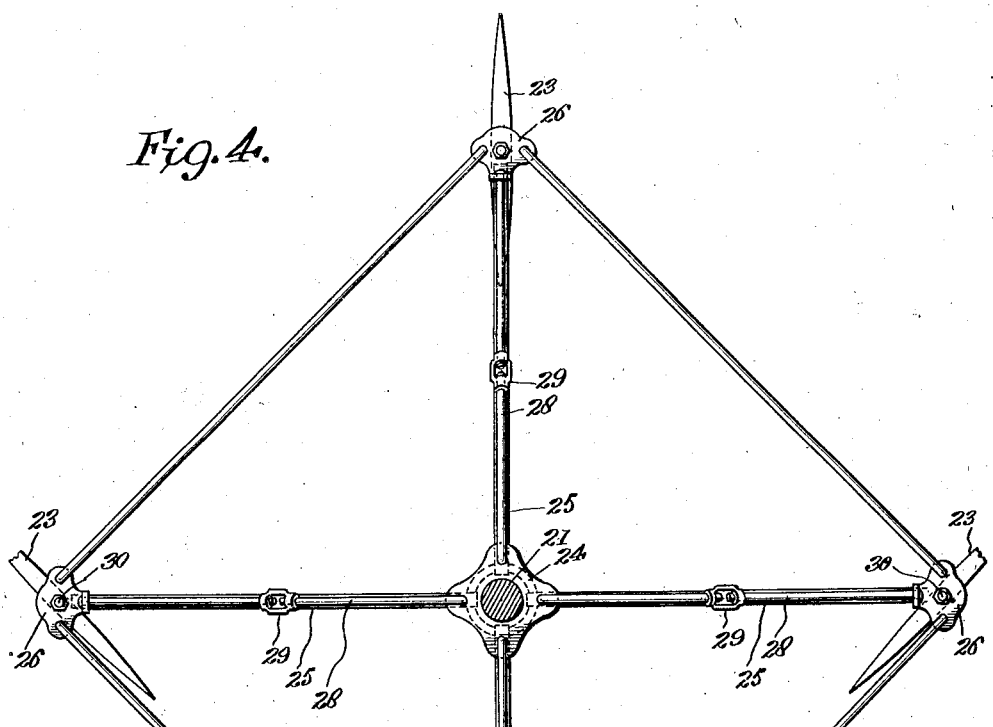
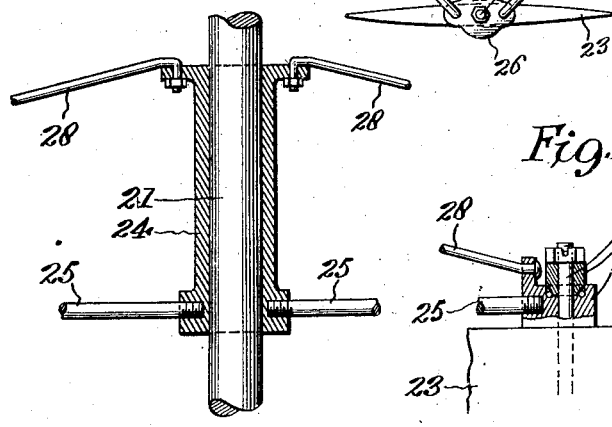
Inventor
L. C. Weaver
by Mawhinney &
Mawhinney
Attorneys.

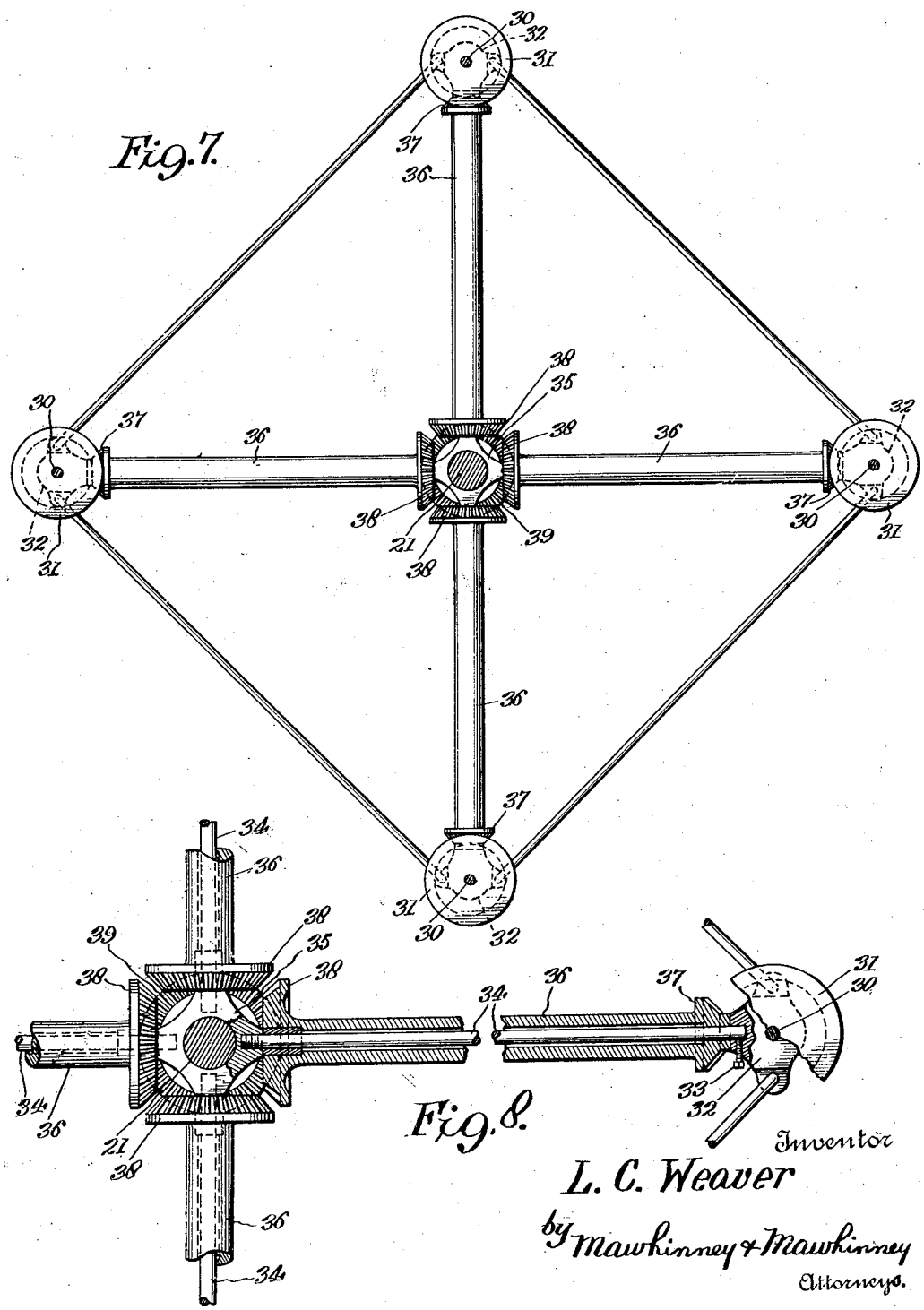

Aug. 16, 1927. 1,639,545
L. C. WEAVER
AUTOMATIC CONTROL FOR WINDMILLS
Filed Nov. 22, 1926  5 Sheets-Sheet 5
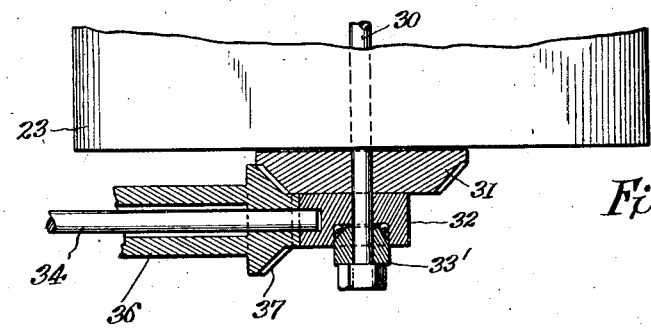
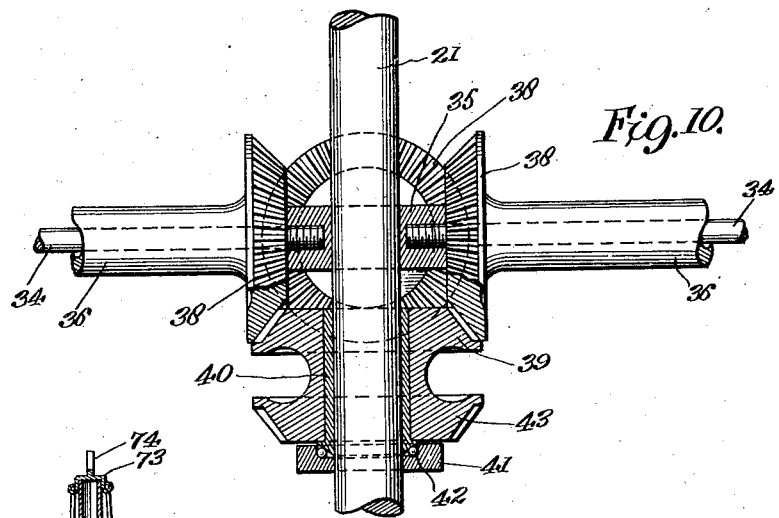
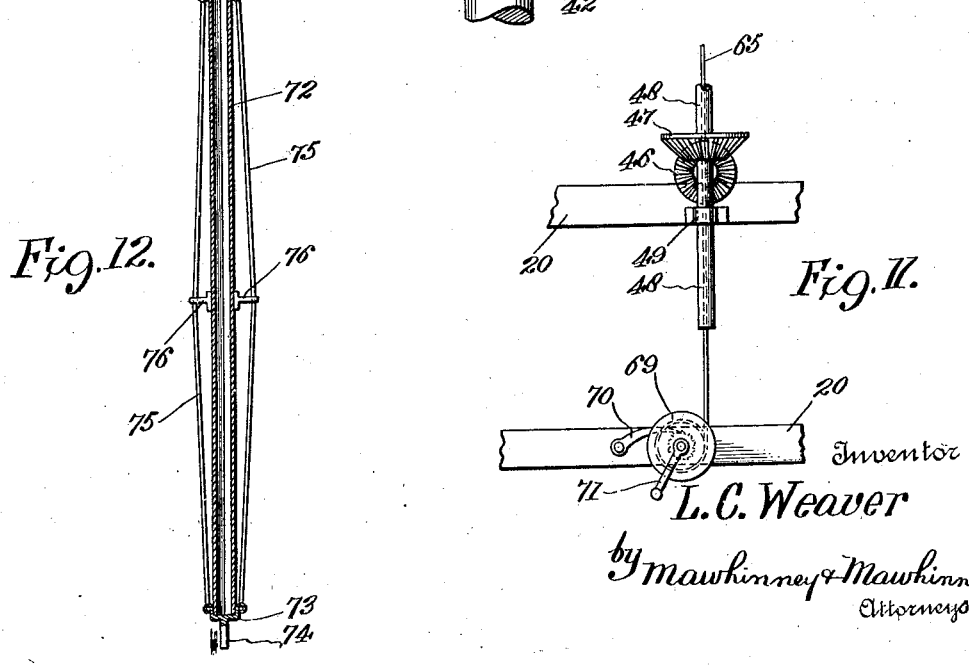
Inventor
L. C. Weaver
by Mawhinney & Mawhinney
Attorneys.

Patented Aug. 16, 1927.

1,639,545

UNITED STATES PATENT OFFICE.

LONNIE C. WEAVER, OF DEMING, NEW MEXICO.

AUTOMATIC CONTROL FOR WINDMILLS.

Application filed November 22, 1926. Serial No. 150,011.

The present invention relates to windmills, and more particularly to an automatic controlling device for the same.

An object of the present invention is to provide a windmill structure embodying controlling means to obtain a steady and uniform driving power from a variable wind pressure, and at the same time to provide means for presenting windmill vanes at the required angle to the wind irrespective of the shifting of the winds to various quarters.

Another object of the invention is to provide a windmill structure, which may be mounted in the usual tower and from which power may be taken and carried down the tower or otherwise, as is found necessary incident to the work to be performed, and a windmill structure which is of simple, economical and substantial form.

Briefly stated the invention provides a revoluble member with a plurality of rotatable vanes mounted thereon; the vanes are provided with means for turning the same in properly timed relation to present their flat sides toward the wind to propel the revoluble member and to turn the vanes edgewise against the wind when it is desired to cut the same so that the revoluble member may be operated in one direction only.

The invention also embodies an automatic means, which is connected to the vane controlling means and forms a part thereof, whereby the angles of the vanes may be varied as presented to the wind incident not only to the shifting of the winds, but also to the variations in the pressure of the winds, so that the revoluble member may be driven at a substantially even rate of speed and to transmit a substantially uniform power effort.

With the foregoing and other objects in view, the invention will be more fully described hereinafter, and will be more particularly pointed out in the claims appended hereto.

In the drawings, wherein like symbols refer to like or corresponding parts throughout the several views.

Figure 4 is a detail top plan view of the revoluble vane carrier.

Figure 5 is a fragmentary sectional view of the upper sleeve or hub member of the vane carrier mounted on the supporting shaft.

Figure 6 is a fragmentary sectional view, enlarged, of one of the upper connections of a vane to the vane member.

Figure 7 is a transverse section taken through the lower end of the revoluble vane member on the line 7—7 of Figure 1.

Figure 8 is a fragmentary sectional view, enlarged, of the drive connections through the lower portion of the revoluble vane member, showing the connection with one of the vanes.

Figure 9 is a fragmentary enlarged view of the lower end of one of the vanes mounted in the revoluble member and connected to the rotating device.

Figure 10 is a further enlarged detail view in elevation and section showing the differential drive for the vanes.

Figure 11 is a fragmentary side elevation of the manually operable means for adjusting the normal position of the controlling member and for stopping the mechanism, and Figure 12 is a vertical section taken transversely through the central portion of a modified form of vane which may be used.

Figure 1:
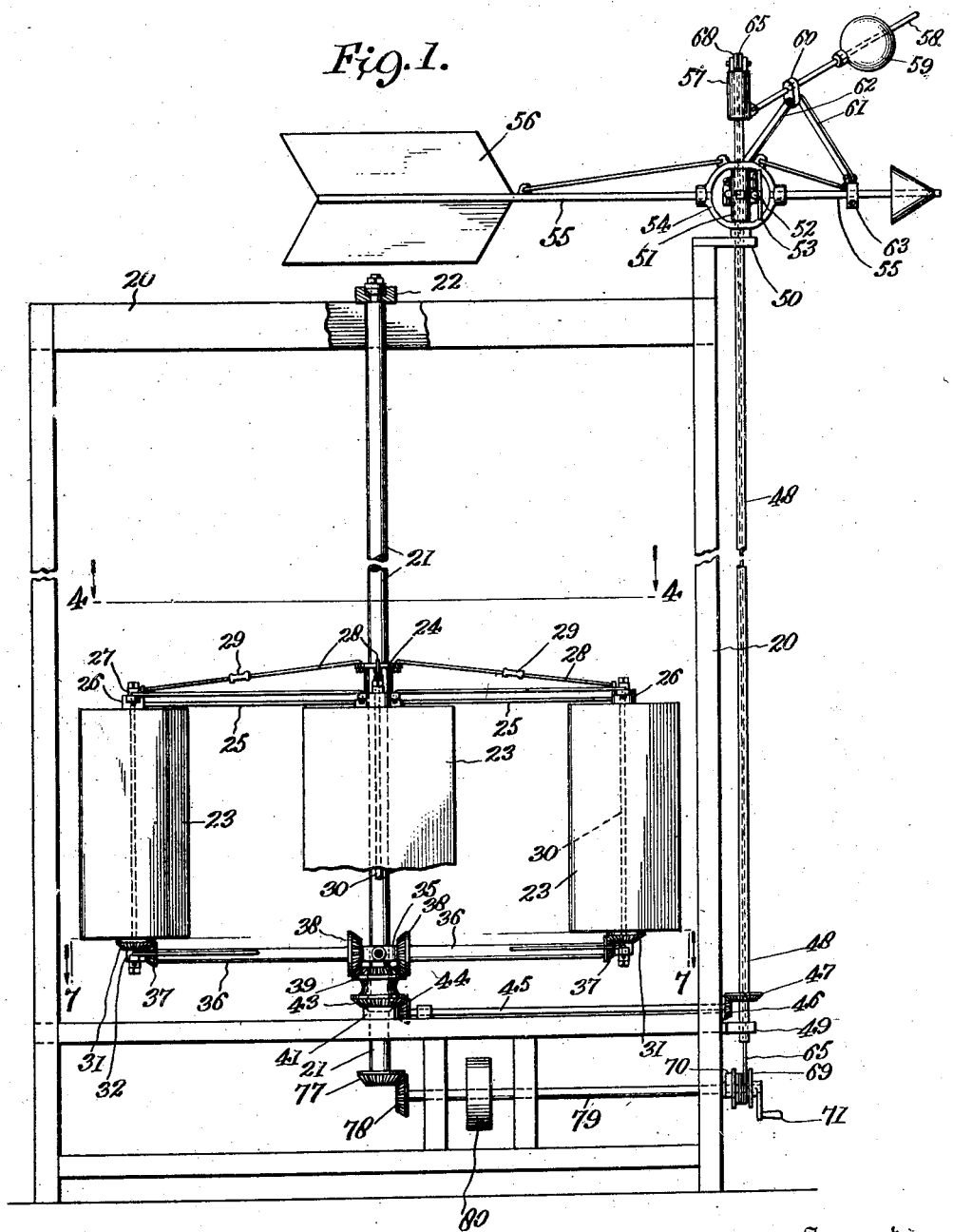
Figure 1 is a side elevation, partly broken away, of the upper portion of a wind mill tower having a windmill and controlling means constructed according to the present invention applied thereto.

Referring to the drawings, 20 designates a frame or tower for the windmill and which may be of any suitable height, and which is provided centrally with a vertical shaft 21 mounted at its upper end in a bearing 22 carried by the frame 20, so as to suspend the shaft 21 and take up the weight which is imposed on the shaft. The shaft 21 is provided with a rotary member in which are mounted a number of vanes 23. The rotary member comprises upper and lower sections between which the vanes 23 are disposed. The upper section comprises a sleeve 24 fixed upon the shaft 21 and provided with a plurality, four in number in the present instance, of radial arms 25 threaded or otherwise suitably secured in the sleeve 24 and which extend outwardly to the vanes 23. Each arm 25 carries a bearing plate 26 on its outer end to receive the shaft of the vane 23 as hereinafter pointed out, and is also provided with a recessed bearing part in its upper side to receive a supporting cone 27 or other suitable bearing to receive the vane shaft. The plates 26 and the arms 25 are supported in horizontal position by braces 28, which extend from the plates 26 inwardly to the upper end of the sleeve 24 and are fastened to the sleeve. These braces 28 are in the form of rods provided intermediately with turn buckles 29 by means of which the rods 28 may be adjusted to take up slack or to otherwise true the rotary member. The vanes 23 are in the form of flat substantially rectangular bodies having suitable thickness intermediate their longitudinal edges to receive a fixed shaft 30 therethrough, the longitudinal edges of the vanes 23 tapering practically to an edge as disclosed in Figures 2 and 4. The shaft 30 projects from the upper end of the vane 23, through the bearing plate 26 and into the supporting cone 27. The lower end of the shaft 30 projects below the vane 23, as shown particularly in Figure 9 and has fixed to it a beveled gear 31 facing downwardly. The lower extremity of the shaft 30 passes through a lower bearing plate 32 and into a bearing cone 33'. The plate 32 is fixed by a set screw 33 upon the outer end of a rod 34 which extends radially from a spider 35 fixed to the shaft 21. The rod 34 carries a sleeve or tube 36 provided on its outer end with a beveled pinion 37 meshing with the beveled gear 31. The sleeve 36 has a beveled gear 38 on its inner end, which meshes with a master gear 39 disposed about the shaft 21.

Figure 2:
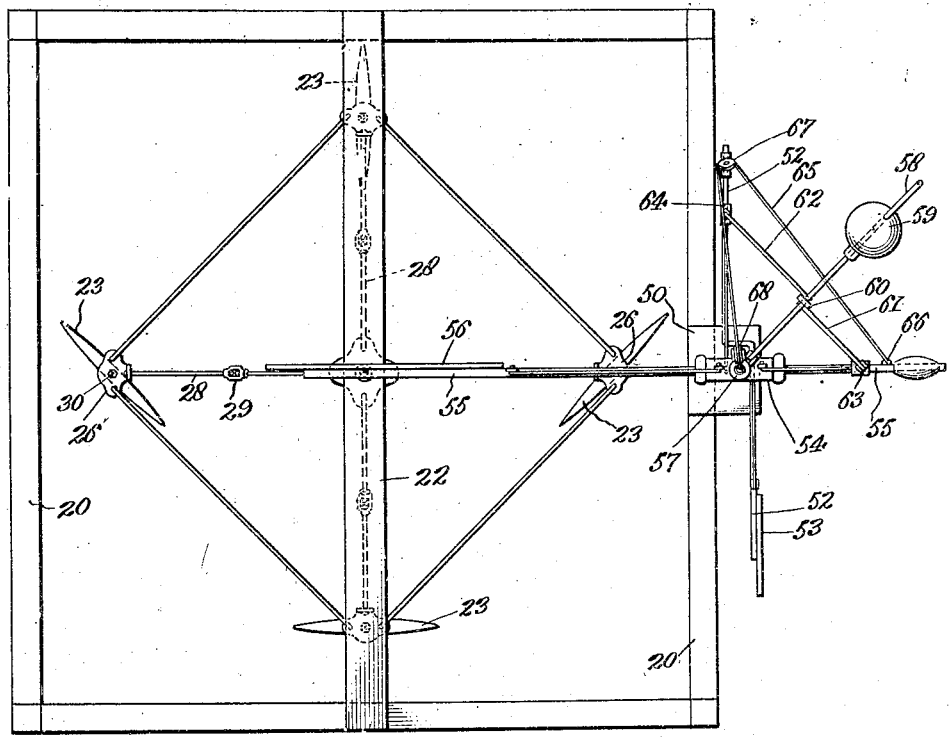
Figure 2 is a top plan view of the same.
Figure 3:
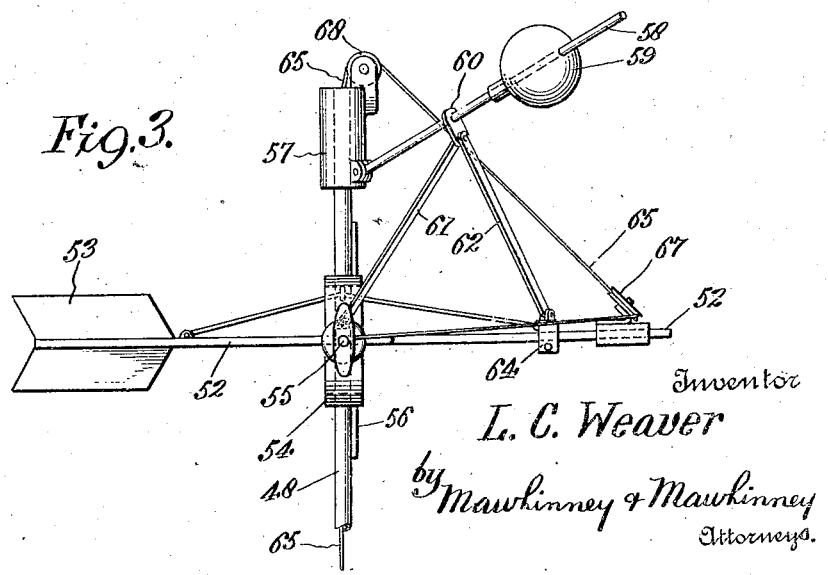
Figure 3 is a detailed enlarged side elevation of the controlling member taken at right angles to the showing in Figure 1.

There is a sleeve or tube 36 for each of the four arms of the lower section of the rotary member to correspond with the upper section of the member and the number of vanes 23 employed. All of the gears 38 mesh with the master gear 39 and may be turned thereby in either direction, so as to rotate the vanes 23. The master gear 39 has a bushing 40 and is freely rotatable on the shaft 21, and is supported against the under sides of the gears 38 by a collar 41 fixed upon the shaft 21 and having suitable bearings 42 upon which the master gear 39 may freely turn. The master gear 39 has a downwardly elongated hub portion, which carries a second beveled gear wheel 43 with which meshes a pinion 44 mounted on a shaft 45 carried in the frame 20 of the windmill and which extends to one side or corner of the same, as shown in Figures 1 and 2. The outer end of the shaft 45 has a pinion 46 meshing with a gear wheel 47 carried on a hollow shaft 48, which extends vertically at the side of the frame or tower 20 and is supported near its lower end in a bearing 49 and near its upper end in a bearing 50, the bearings 49 and 50 being mounted on the tower 20.

The upper end of the shaft 48 rises above the bearing 50 and is provided with a short sleeve 51 fixed to the shaft 48 to turn therewith. The sleeve 51 carries a horizontal arm 52, which extends from opposite sides of the sleeve 51 and carries on one end a blade 53 which is secured vertically at its middle portion to the arm 52. The shaft 48 also carries a pivotally mounted yoke 54 arranged about the sleeve 51 and adapted to turn relatively thereto. The yoke 54 carries a second arm 55 upon which is mounted a second blade 56 spaced from the shaft 48 a distance substantially equal to that at which the blade 53 is spaced from the shaft, so that these two blades 53 and 56 may work toward and from each other as will be later described. The arm 52 turns with the shaft 48 and the arm 55 turns freely on the shaft, and means is provided for normally holding these two arms 52 and 55 at substantially right angles with respect to each other. The means comprises a collar 57 fixed upon the upper end of the shaft 48 and which pivotally supports one end of a weight arm 58 carrying upon its outer end a weight 59, which may be placed on the arm 58 in any suitable position for obtaining the necessary pressure.

The outer end of the weight arm 58 is free, so that the arm tends to swing downwardly particularly under the pressure of the weight 59. At an intermediate point the arm 58 carries a lug 60 to which are pivotally connected the upper ends of two links 61 and 62. The link 61 extends downwardly to the arm 55 near its forward end and is pivotally secured to a collar 63 adjustably mounted on the arm 55. The other link 62 is pivotally secured to a collar 64, which is adjustably mounted upon the forward end of the other arm 52. It is apparent that by adjusting the collars 63 and 64 lengthwise of their arms and toward and from the pivotal support 48, the links 61 and 62 may be more or less spread apart at their lower ends to regulate the effective pressure of the weight 59.

The weight 59 tends to spread the arms 52 and 55 apart and the pressure of the wind against the blades 53 and 56 tends to move the same toward each other and counteract the effect of the weight 59. It is these counteracting forces which applicant employs for the regulation and control of the vanes 23 in the rotary member.

The shaft 48 is so adjusted that as the blades 53 and 56 approach each other or swing together, the vanes 23 are moved gradually toward a position wherein they will be ineffective, so as to stop the revolution of the revoluble member and thus stop the driving mechanism. This condition prevails not only upon the increase in wind pressure against the blades 53 and 56, but also by a manually operable means which may be used to set the control into a neutral or stopping position. This mechanical means comprises a rope or cable 65 secured at one end to a lug 66 of the arm 55 and carried across to the outer end of the other arm 52. The arm 52 carries a pulley 67 over which the cable 65 is passed, the cable being carried upwardly from the pulley 67 to the collar 57, which carries at one side a pulley 68 in such position that the cable 65 is carried downwardly and centrally within the hollow shaft 48.

As shown in Figures 1 and 11, the lower end of the shaft 48 projects beneath the bearing 49 and the cable 65 extends through and beyond the shaft 48 and is wound upon a drum 69 carried by the frame 20 and having a suitable pawl 70 by means of which the drum 69 may be locked in adjusted position. The drum 69 is rotated by a hand crank 71, so as to wind the cable 65 on the drum 69 and draw the cable 65 downwardly through the tubular shaft 48. This action draws the outer ends of the arms 52 and 55 together, lifts the ball 59, and turns the shaft 48, incident to the action of the wind on the blades 53 and 56 to rotate the vanes 23 into a substantially neutral position.

In Figure 12 there is shown a modified form of the vane used in the rotary member. The vane comprises a sheet metal body part 72 which has upper and lower caps 73 which may be castings or the like, and which are fitted over the opposite ends of the body 72. The caps 73 are of the desired configuration and are provided intermediate their ends with stub shafts 74, which take the place of the shaft 30. The caps 73 are held upon the opposite ends of the body 72 by brace rods 75 which may be held taut by struts 76 arranged between the intermediate portions of the brace rods 75 and the opposite sides of the sheet metal body 72. The vane thus constructed is light and durable and may be economically manufactured and installed.

In operation, when the wind is blowing under normal conditions the blades 53 and 56 are balanced in the air current upon the shaft 48 and under the tension of the weight 59. An increase in air pressure moves the arms 52 and 53 toward a collapsed position and thus changes the angular relation of the blades 53 and 56. As the wind pressure immediately balances the blades 53 and 56, the shaft 48 must be rotated in order to bring these blades into such position. This rotation of the shaft 48 is transmitted through the shaft 45 to the master gear wheel 39 and to the vanes 23. The relative angular positions of the vanes 23 is thus shifted or changed, so as to obtain the desired result of turning the vanes at a greater angle to the air current and thus decrease the resistance of the rotary member to the air, with the result that increased air pressure will not increase the speed or power resistance of the rotary member.

Of course, in all positions of adjustment, the revolving action of the rotary member causes the gear wheels 38 to travel around on the master gear wheel 39 with the result that the vanes 23 are continuously revolved, so as to bring them into position to resist the wind at one side of the rotary member and to cut the wind at the opposite side of the rotary member, when the device is adjusted for obtaining full pressure from the wind.

The shaft 21 is provided on its lower extremity with a beveled gear wheel 77 meshing with a second beveled gear wheel 78 on a drive shaft 79. The shaft 79 may have a pulley 80 or the like thereon for the purpose of taking off power from the shaft as it is driven by the rotary vane carrying member.

It is apparent that one or any number of sets of vanes may be utilized in order to develop the power required for different kinds of work, and that all of the sets of vanes may be connected to the main shaft 21 and to the governor shaft 48, so that they may all be controlled from the single governor. It is also apparent that the mechanism may be enclosed in suitable housings or casing to protect the gears and shafts and also for the purpose of maintaining a proper supply of lubricant to the parts. It is, therefore, evident that the invention provides a powerful windmill which may be constructed in any number of units to develop the high power required.

It is obvious that various changes and modifications may be made in the details of construction and design of the above specifically described embodiment of this invention without departing from the spirit thereof, such changes and modifications being restricted only by the scope of the following claims.

What is claimed is:—

1. In a windmill, the combination of a revoluble member, a plurality of vanes carried by the revoluble member, a normally stationary master element connected to the vanes for causing the same to turn in a definite angular relation with respect to one another, a shaft geared to said master element, an arm fixed to the shaft, a second arm pivoted to the shaft, means for normally swinging the free ends of said arms apart, and blades carried by said arms for impact with air currents to counter-balance the arms and move said master element for positioning the vanes for impact with air currents, said arms adapted to be contracted for further shifting said master element to vary the angle of impact of the vanes with the air current.

2. In a windmill, the combination of a revoluble member, a plurality of vanes pivoted on the revoluble member, a master gear, gears connected to the vanes meshing with the master gear for turning the vanes upon the rotation of the revoluble member, a shaft connected to the master gear, an arm fixed upon the shaft and having an air impact blade, a second arm pivoted to the shaft and having a second air impact blade, means disposed between the arms for spreading the same apart and spreading said blades, said blades to be moved toward each other by pressure of an air current to turn said shaft with respect to the direction of the air current and with respect to the pressure of the air against said blades.

3. In a windmill, the combination of a revoluble member, a plurality of vanes mounted to turn on said member, gearing connected to said vanes for maintaining the same in definite angular relation with respect to one another, a shaft connected to said gearing, an arm fixed to the shaft, a second arm pivoted to the shaft, a pair of blades mounted on one end of the arms for impact with an air current to swing the shaft into a predetermined position for operating the vanes and changing their position with respect to the direction of the air current, means for spreading said arms to offer resistance to said blades to contraction under air pressure, said blades adapted to contract under increased air pressure to turn the shaft and change the angular relation of the blades with respect to the air current.

4. In a windmill, a revoluble member, a plurality of vanes carried by the revoluble member, gearing connected to the vanes for maintaining the same in definite angular relation and for turning the vanes when the revoluble member is revolved, a controlling device connected to said gearing, a pair of arms on the controlling device normally urged apart at their free ends and having air impact blades on their free ends, a weight carried by the controlling device, and a toggle connection between said weight and the free ends of said arms for normally urging the arms apart under the action of said weight.

In testimony whereof I affix my signature.

LONNIE C. WEAVER.